(12) United States Patent
Wanami

(10) Patent No.: US 9,008,896 B2
(45) Date of Patent: Apr. 14, 2015

(54) SYSTEM FOR DETECTING RUN OVER ACCIDENT

(71) Applicant: DENSO Corporation, Kariya, Aichi-pref. (JP)

(72) Inventor: Shingo Wanami, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 14/104,046

(22) Filed: Dec. 12, 2013

(65) Prior Publication Data
US 2014/0180530 A1 Jun. 26, 2014

(30) Foreign Application Priority Data

Dec. 20, 2012 (JP) ................................. 2012-278097

(51) Int. Cl.
*B60R 21/0136* (2006.01)

(52) U.S. Cl.
CPC .................................. *B60R 21/0136* (2013.01)

(58) Field of Classification Search
CPC .................................................. B60R 21/0136
USPC ......................................................... 701/32.2
See application file for complete search history.

(56) References Cited

U.S. PATENT DOCUMENTS

| | | | |
|---|---|---|---|
| 7,873,449 B2 * | 1/2011 | Bujak et al. | 701/33.7 |
| 8,032,281 B2 * | 10/2011 | Bujak et al. | 701/37 |
| 8,255,117 B2 * | 8/2012 | Bujak et al. | 701/37 |
| 8,255,118 B2 * | 8/2012 | Bujak et al. | 701/37 |
| 2005/0264403 A1 | 12/2005 | Nobusawa | |
| 2008/0147277 A1 * | 6/2008 | Lu et al. | 701/45 |
| 2008/0243327 A1 * | 10/2008 | Bujak et al. | 701/29 |
| 2012/0232740 A1 | 9/2012 | Sun et al. | |

FOREIGN PATENT DOCUMENTS

| | | |
|---|---|---|
| JP | 11-070844 | 3/1999 |
| JP | 2005-112043 | 4/2005 |
| JP | 2010-244167 | 10/2010 |
| JP | 2012-176688 | 9/2012 |
| JP | 2012-185801 | 9/2012 |

OTHER PUBLICATIONS

Office Action dated Nov. 13, 2014 in corresponding JP Application No. 2012-278097 with English translation.

* cited by examiner

*Primary Examiner* — Mary Cheung
*Assistant Examiner* — Anne Mazzara
(74) *Attorney, Agent, or Firm* — Harness, Dickey & Pierce, PLC

(57) ABSTRACT

A system for detecting a run-over accident has sensors and a controller. The sensors provide collision detectors which is arranged on at least one of front and rear of a vehicle. The controller provides a collision determining module which determines an existence of a collision based on a detection result of the collision detector. The sensors provide a run-up detector which detects that a tire of the vehicle runs up something. The controller provides a run-up determining module which determines an existence of a run-up based on a detection result of the run-up detector. The controller provides a run-over determining module which determines an existence of a run-over accident when the run-up determining module determines an existence of a run-up within a predetermined first time period from the collision determining module determines an existence of a collision.

10 Claims, 4 Drawing Sheets

SYSTEM FOR DETECTING RUN OVER ACCIDENT

CROSS REFERENCE TO RELATED APPLICATION

This application is based on Japanese Patent Application No. 2012-278097 filed on Dec. 20, 2012, the disclosure of which is incorporated herein by reference.

TECHNICAL FIELD

The present disclosure relates to a system for detecting an accident of run-over, in which a vehicle runs over an object.

BACKGROUND

It is important to provide rapid rescue work after a traffic accident especially for vulnerable victims, such as pedestrians and riders of bicycle. JP2005-112043 discloses an emergency reporting system which may meets needs of rapid rescue work. In the emergency reporting system for vehicle, if a collision detecting means mounted on the vehicle detects a collision with a pedestrian, then the system lifts an engine hood to reduce damages to a pedestrian head and makes an emergency call. Thereby, rapid rescue work may be provided to a collision in which a pedestrian falls on the engine hood.

SUMMARY

The system in JP2005-112043 uses a technology which detects a shock created by a collision of a vulnerable victim on a bumper of the vehicle. In a case of an accident in which a slow speed vehicle softly hits and run over a victim, however, since it is difficult to detect a shock of collision due to relatively small shock on a bumper, it is also difficult to make an emergency call. Therefore, it is necessary to provide technology which is capable of detecting a run-over type accident correctly.

It is an object of the present disclosure to provide a system for detecting a run-over accident which is capable of detecting a run-over accident correctly.

According to a disclosure, a system for detecting a run-over accident is provided. The system comprises a collision detector which detects a collision and is arranged on at least one of a front or a rear of a vehicle and a collision determining module which determines that whether a collision exists or not based on a detection result of the collision detector. The system comprises a run-up detector which detects that a tire of the vehicle runs up onto a something and a run-up determining module which determines that whether a run-up exists or not based on a detection result of the run-up detector. The system further comprises a run-over determining module which determines that a run-over accident exists when the run-up determining module determines an existence of a run-up within a predetermined first time period after the collision determining module determines an existence of a collision.

According to this configuration, when the vehicle collide with a victim, such as a pedestrian, the collision can be detected, and then, a run-over accident is determined if a run-up of a tire is detected within a predetermined time period. Thereby, a run-over accident can be detected correctly. This correct determination may enable a quick report of an accident, an appropriate warning to a driver, or appropriate control for a vehicle. The symbols in the parenthesis indicated in the above section and the claim merely show correspondence relations with concrete elements described in embodiments later mentioned as one example, and are not intended to limit the technical scope of this disclosure.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, embodiments of the present disclosure is explained based on the attached drawings. Components and parts corresponding to the components and parts described in the preceding description may be indicated by the same reference number and may not be described redundantly. In a case that only a part of component or part is described, other descriptions for the remaining part of component or part in the other description may be incorporated. The embodiments can be partially combined or partially exchanged in some forms which are clearly specified in the following description. In addition, it should be understood that, unless trouble arises, the embodiments can be partially combined or partially exchanged each other in some forms which are not clearly specified. In addition, each figure used for explanation is a schematic view, and the form of each part may not necessarily be strict.

First Embodiment

Figure 1:
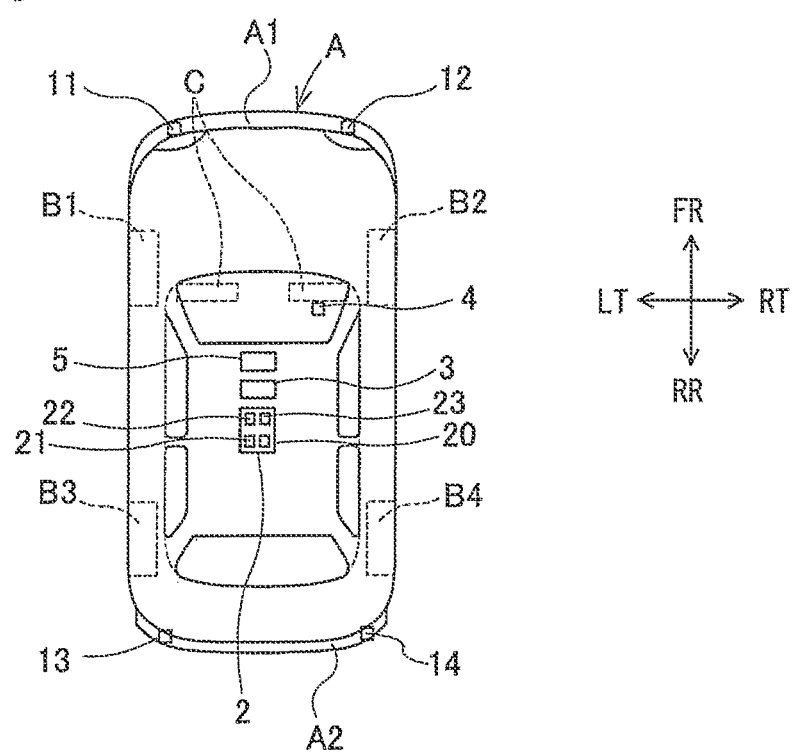
FIG. 1 is a block diagram showing a system for detecting a run-over accident mounted on a vehicle according to a first embodiment.

FIG. 1 shows a system for detecting a run-over accident according to a first embodiment. The system has sensors, a controller, a reporting device, and a warning device. The sensors include front G-sensors, such as a front-left G-sensor 11, and a front-right G-sensor 12. The sensors include rear G-sensors, such as a rear-left G-sensor 13 and a rear-right G-sensor 14. The controller is provided by an ECU 5 (Electronic Control Unit) for an air-bag system. The reporting device corresponds to a reporting module to send a report about an accident to a predetermined entity. The reporting device may be provided by a wireless communication device 3, which may be a terminal of a mobile phone system. The warning device 4 corresponds to a warning module and is provided by an audible sound generator, or a visible sign generator such as a display or a warning lamp. In the drawing, a front-rear direction FR-RR and a right-left direction RT-LT are indicated. An up-down direction corresponds to a vertical direction to the surface of the drawing.

The front G-sensors 11 and 12 are accelerometers arranged in a front bumper A1 of the vehicle "A". The front G-sensors 11 and 12 detect the acceleration on the front-rear direction FR-RR, which may be also referred to as an X-direction. The rear G-sensors 13 and 14 are accelerometers arranged in a rear bumper A2 of the vehicle "A". The rear G-sensors 13 and 14 detect the acceleration on the front-rear direction FR-RR. These G-sensors 11-14 corresponds to a collision detector which detects a collision. The front G-sensors 11 and 12 can detect a collision on a front side of the vehicle with sufficient accuracy. The rear G-sensors 13 and 14 can detect a collision on a rear side of the vehicle with sufficient accuracy.

The ECU 2 is an electronic control unit which controls deployment of an air bag "C" which is an occupant protection device. In this embodiment, the controller is provided by the ECU 2 for air bag, it is possible to provide the controller by one or more other ECU on the vehicle.

The controller is an electrical control unit (ECU). The controller has at least one processing unit (CPU) and at least one memory device (MMR) provided as a storage medium which stores a set of program and data. The controller is provided with a microcomputer having the storage medium readable by a computer. The storage medium is a non-transitory storage medium which stores a program readable by the computer. The storage medium can be provided by a device, such as a solid state memory device and a magnetic disc memory. The controller is provided with one computer, or a set of computer resources linked by a data communication device. The program, when executed by the controller, makes the controller to function as devices described in this specification, and makes the controller to perform methods described in this specification. The controller provides a plurality of various elements. At least a part of those elements may be called as means for performing functions, and, in another aspect, at least a part of those elements may be called as structural blocks or modules.

The ECU 2 is arranged in a non-exposed portion, for example, in an accommodation box, in a room of the vehicle. The ECU 2 is mainly provided with a microcomputer 20, a gyro sensor 21, a G-sensor 22, and an event recorder 23. The G-sensor 22 provides and corresponds to a run-up detector. The event recorder 23 provides and corresponds to an accident recorder. The event recorder 23 records information relating to collisions and run-over accidents. For example, the even recorder 23 stores a number of determinations showing existences of run-ups. However, the gyro sensor 21 is not necessary to be mounted thereon.

The gyro sensor 21 is a sensor which measures a yaw rate (yaw angular speed), a roll rate (roll angular speed), and a pitch rate (pitch angular speed). The G sensor 22 is a sensor which at least measures acceleration in an up and down direction (Z axis direction) of the vehicle. In this embodiment, the G sensor 22 measures three dimensional accelerations, in the front and rear direction (X axis direction), the right and left direction (Y axis direction), and the up and down direction (Z axis direction).

Figure 2:
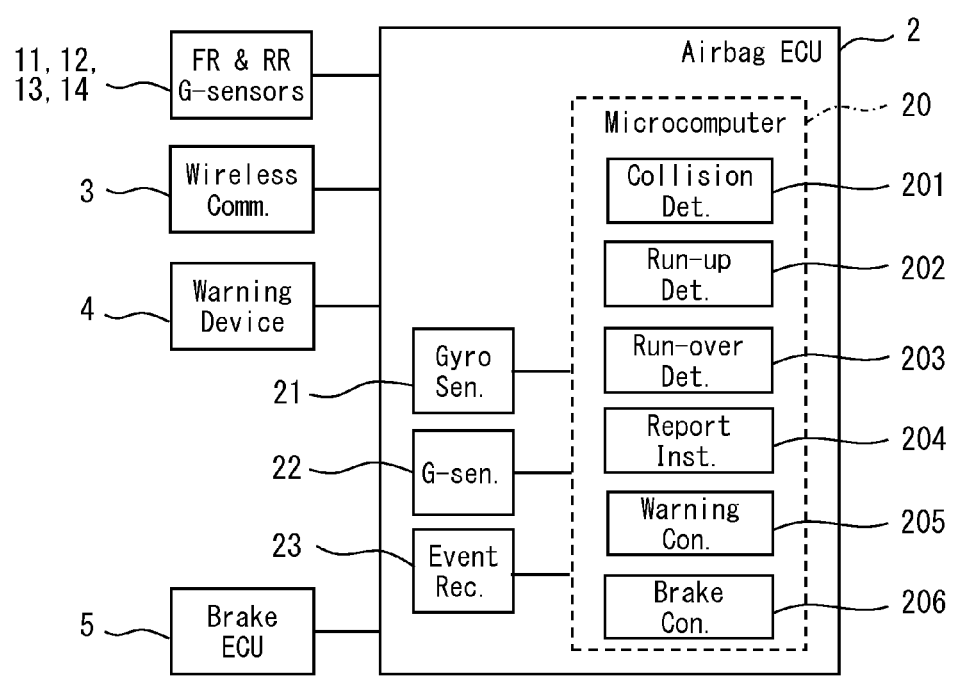
FIG. 2 is a block diagram showing details of the system according to the first embodiment.

As shown in FIG. 2, the ECU 2 provides functional blocks mainly realized by the microcomputer 20. The ECU 2 provides a collision determining module 201, a run-up determining module 202, a run-over determining module 203, a report instruction module 204, a warning control module 205, and an intervening brake control module 206.

The collision determining module 201 determines an existence of a collision based on the detection result of the G sensors 11-14. Concretely, the collision determining module 201 stores a collision threshold THG which is predetermined for the G sensors 11-14. The collision determining module 201 compares the detection results, which may also be referred to as a collision signal HG, with the collision thresholds. Then, the collision determining module 201 determines that "a collision exists" when either one of the detection results exceeds the collision threshold corresponding to the result. The collision determining module 201 transmits a determination, i.e., a result, to the other modules 203-206.

The run-up determining module 202 determines an existence of a run up of one of tires B1-B4 on a something based on the detection result of the G sensor 22. In other words a run-up is determined based on an acceleration of the vehicle in a vertical direction. The signal indicative of a run-up from the G sensor 22 may also be referred to as a run-up signal VG. The run-up determining module 202 stores a predetermined first threshold TH1 for determining an existence of a run-up, a predetermined second threshold TH2 for determining a beginning of a run-up, and a predetermined third threshold TH3 for determining an ending of a run-up. The second threshold TH2 is set equal to or less than the first threshold TH1. The third threshold TH3 may just be set less than the first threshold TH1. In this embodiment, the second threshold TH2 equal to the third threshold TH3, and both TH2 and TH3 are set less than the first threshold TH1.

The run-up determining module 202 determines that "a run-up exists", when the detection result of the G sensor 22 exceeds the first threshold TH1. The run-up determining module 202 determines that "a beginning of a run-up", when the detection result of the G sensor 22 exceeds the second threshold TH2. The run-up determining module 202 determines that "an ending of a run-up", when the detection result of the G sensor 22 falls less than the third threshold TH3 after once an existence of a run-up is determined. The run-up determining module 202 transmits a determination, i.e., a result, to the other modules 203-206.

Figure 3:
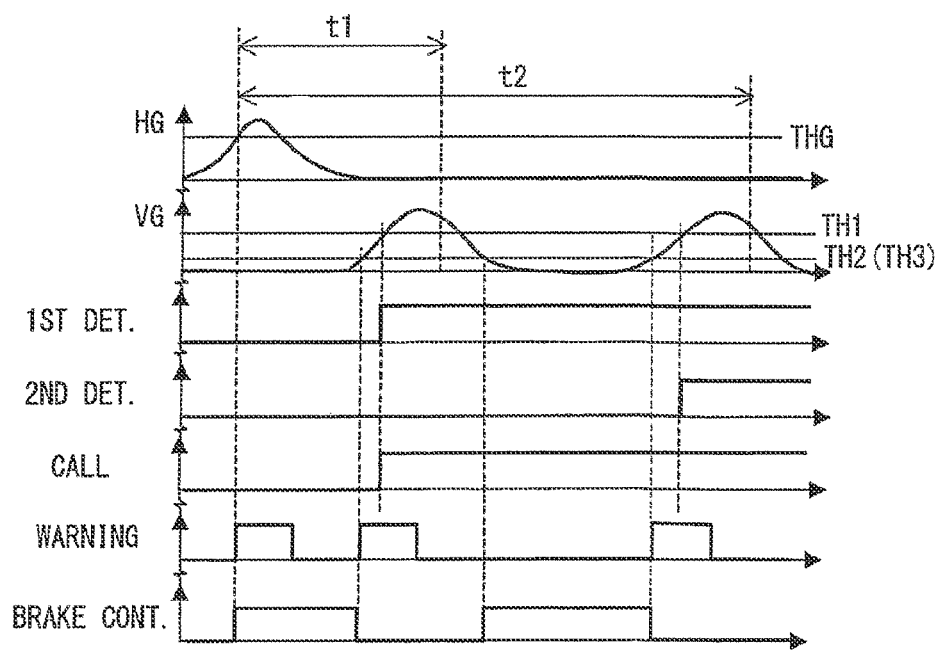
FIG. 3 is a timing diagram showing an example of operation of the system according to the first embodiment.

As shown in FIG. 3, the run-over determining module 203 determines an existence of a run-over accident, i.e., a first run-over, when the run-up determining module 202 determines an existence of a run-up within a predetermined first time period t1 from the collision determining module 201 determines an existence of a collision. In other words, the run-over determining module 203 begins a time count function in response to receiving a signal indicative of an existence of a collision from the collision determining module 201. Then, the run-over determining module 203 determines an existence of a run-over accident when a signal indicative of an existence of a run-up from the run-up determining module 202 is received before a counted time exceeds the predetermined first time period t1.

The run-over determining module 203 determines an existence of a following run-over accident, i.e., a second run-over, after the run-over determining module determines an existence of a previous run-over accident, when the run-up determining module 202 determines an existence of a run-up again within the predetermined second time period t2 after the collision determining module determines an existence of a collision which is a basis for the determination of the previous run-over accident. That is, in a single collision, the run-over determining module 203 determines an existence of a first run-over accident if a run-up is determined within a predetermined first time period t2, and the run-over determining module 203 also determines an existence of a second run-over accident if a run-up is again determined within the predetermined second time period t2.

For example, a vehicle may create a run-over accident twice by a front tire and a rear tire when the vehicle traveling forward. According to this embodiment, it is possible to detect both run-over accidents. A number of times of run-over accidents may provide information for judging a level of injury of a victim and an urgent degree. The run-over determining module 203 transmits a determination, i.e., a result, to the other modules 204-206 and the event recorder 23.

The run-over determining module 203 receives information about a speed of the vehicle at the time of a collision determination from a speed sensor (not shown). The run-over determining module 203 varies the predetermined first time period t1 according to the speed. The predetermined first time period t1 may be determined by calculation using a function expression showing a relation between the speed and the predetermined first time period t1 or by looking up a database showing the relation. Moreover, the predetermined second time period t2 may also be varied according to the speed in a similar manner. In addition, the predetermined first time period t1 and the predetermined second time period t2 may be fixed values respectively.

The report instruction module 204 generates instruction to transmit a report to a predetermined entity. The report instruction module 204 sends the instruction to the wireless communication device 3 in response to a signal showing a run-over accident from the run-over determining module 203 when the run-over determining module 203 determines an existence of a run-over accident. The wireless communication device 3 is a device which makes possible telephone call and data communication by wireless transmitter and receiver. The wireless communication device 3 may be provided by a wireless communication ECU on the vehicle which performs as a terminal device of a telecommunication system. An example of the predetermined entity is an organization which may operate emergency service or has power to order emergency service directly or indirectly. For example, the predetermined entity may be a public organization, such as a public emergency call center for fire authorities or police stations etc. The predetermined entity may be a private organization, such as an emergency hospital, an emergency hospital operating a doctor helicopter, a company operating ambulances, or a vehicle related service company which usually established by a vehicle maker and may be called as a vehicle management center, an operation center or an operation service company. That is, the wireless communication device 3 automatically reports an accident to the predetermined entity if it is determined that a run-over accident exists. The predetermined first time period t1 may also be called as a permission time period for an emergency report instruction.

The wireless communication device 3 transmits an existence of a run-over accident, which is a run-over accident data, as a data form or a predetermined voice form to a receiver. Moreover, the wireless communication device 3 adds information relating to the accident, such as location data which shows location the accident happens retrieved via a navigation device etc. to the run-over accident data, and send it. The wireless communication device 3 reads out information, including the number of times of run-overs etc., from the event recorder 23, and also sends the information as the run-over accident data.

The warning control module 205 generates and transmits a plurality of warning instructions to the warning device 4 in response to each event in an accident. The warning control module 205 generates and transmits a warning instruction when the collision determining module 201 determines an existence of a collision. The warning control module 205 generates and transmits a warning instruction when the run-up determining module 202 determines a beginning of a run-up within a predetermined first time period t1 from the collision determining module 201 determines an existence of a collision. The warning control module 205 generates and transmits a warning instruction when the run-up determining module 202 determines a beginning of a run-up within a predetermined second time period t2 from the collision determining module 201 determines an existence of a collision.

The warning device 4 is a device which generates warning to a driver by using at least one of audible means or visible means. The warning device 4 of this embodiment is a device which emits a warning sound for a predetermined time period. The warning device 4 may be a display disposed close to a driver seat, e.g., disposed on an instrument panel etc. In this case, the warning device 4 may displays a message about a run-over accident on the display.

The intervening brake control module 206 transmits instructions of an intervening brake control, which is a brake control to activate a brake device, to the brake ECU 5. The brake ECU 5 corresponds to a brake control module. Concretely, the intervening brake control module 206 transmits a start instruction of an intervening brake control, which is a brake control to activate a brake device, to the brake ECU 5 in a predetermined start case. The predetermined start case is a case where the collision determining module 201 determines an existence of a collision, and a case where the run-up determining module 202 determines an ending of a run-up for the first time after the run-over determining module 203 determines an existence of a run-over.

The intervening brake control module 206 transmits a stop instruction of the intervening brake control to the brake ECU 5 in a predetermined stop case. The predetermined stop case is a case where the run-up determining module 202 determines a beginning of a run-up during the intervening brake control is performed. That is, the intervening brake control module 206 instructs the intervening brake control to the brake ECU 5 for a period from a determination of an existence of a collision to a determination of an existence of a run-up, and for a period from a determination of an ending of a run-up to a determination of a beginning of a run-up.

The event recorder 23 is a nonvolatile memory device. The event recorder 23 records information relating to a run-over accident which may include information, i.e., an existence of a run-over accident, received from the run-over determining module 203, and information showing circumstances at an accident, such as a speed at the accident and a location of the accident. The event recorder 23 also records a number of determinations of existences of run-overs made by the run-over determining module 203 with respect to an existence of a collision. The event recorder 23 records a number of run-over accidents on and after a determination of an existence of a run-over. That is, the number of run-overs includes the first determination of an existence of a run-over and following determinations of existences of run-overs. The event recorder 23 may record, on and after the run-over determining module 203 determines an existence of a run-over, a number of determinations showing existences of run-ups determined by the run-up determining module 202 within a predetermined second time period t2 from a determination of an existence of a collision made by the collision determining module 201 which is a basis for the determination of the existence of the first run-over.

According to the system of the first embodiment, a run-over accident is detected by detecting a collision, and detecting run-up motion by any of the tires B1-B4 with in a predetermined time period after the collision. Therefore, it is possible to detect a run-over accident with high accuracy. According to the first embodiment, if a run-over accident is detected, information relating to the run-over accident is automatically reported to a predetermined entity by using the wireless communication device 3. Thereby, even if a driver can not take appropriate measure, it is possible to perform quick and appropriate reports and to expect quick and appropriate rescue works by the entity.

Moreover, according to the first embodiment, the warning device 4 generates a warning to a driver at both timings of a collision and a beginning of a run-up of a tire after a collision. Thereby, it is possible to notice a driver a possibility of a run-over, and to prevent a run-over accident and a second, i.e., following run-over accident.

Moreover, according to the first embodiment, an intervening brake control is performed by the intervening brake control module 206 and the brake ECU 5 for a period between a collision and a beginning of a run-up and/or a period between an ending of a first run-up and a beginning of a second run-up. Thereby, regardless of driver's operation, it is possible to reduce possibilities of a run-over accident and a following run-over accident. Moreover, since an intervening brake control is suspended at the time of a beginning of a run-up, it is possible to reduce possibilities that the vehicle stops while running over a victim.

Moreover, according to the first embodiment, since the predetermined first time period t1 is determined according to a speed of the vehicle, it is possible to accurately determine a run-over accident which is highly linked with a speed at a collision. Moreover, according to the first embodiment, since the number of times of run-over is recorded on the event recorder 23, it is possible to serve appropriate judgment of accident situations and damaged level by providing stored data at the time of a report or a time of following data read-out. For example, the system may be configured to transmit data, which is indicative of the number of run-overs, such as two-times, when reporting a run-over accident. Thereby, an entity received the report may judge or recognize a seriousness of the accident and take appropriate measure.

Second Embodiment

The run-over accident detecting system according to a second embodiment differs from the first embodiment in that a speed of the vehicle is added to the conditions for beginning the intervening brake control. Hereafter, different points are explained. The same drawings for the first embodiment can be referred to.

The intervening brake control module 206 receives information indicative of a speed of the vehicle at a time when the collision determining module 201 determines an existence of a collision. The intervening brake control module 206 uses a set of beginning conditions which includes a condition that the speed is equal to or less than a predetermined speed as a precondition, and also includes the other conditions similar to the first embodiment. The intervening brake control module 206 send and transmits a beginning instruction for the intervening brake control when the beginning conditions are satisfied. That is, the intervening brake control module 206 send and transmits a beginning instruction for the intervening brake control in both situations. The one situation is when the collision determining module 201 determines an existence of a collision, and, in addition, the speed at the time of the collision determining module 201 determines an existence of a collision is equal to or less than a predetermined speed. The other one situation is when the run-up determining module 202 determines an ending of a run-up first time after the run-over determining module 203 determines an existence of a run-over.

The speed at the time of the collision determining module 201 determines an existence of a collision is a speed at any time until the signal exceed the collision threshold from a collision is detected. In the second embodiment, a speed when the detection result exceeds the collision threshold is used as a speed to be compared. In other words, a speed when the detection result exceeds the collision threshold is used as the speed at the time of the collision determining module 201 determines an existence of a collision.

According to the second embodiment, in addition to advantages of the first embodiment, it is possible to perform a suitable intervening brake control when the vehicle is driven in a relatively slow speed in a forward or backward direction. Since victims may be bounced up when the vehicle is driven in a relatively high speed, advantages of the intervening brake control can be more effectively demonstrated in a case of relatively low speed collision.

Other Modifications

Figure 4:
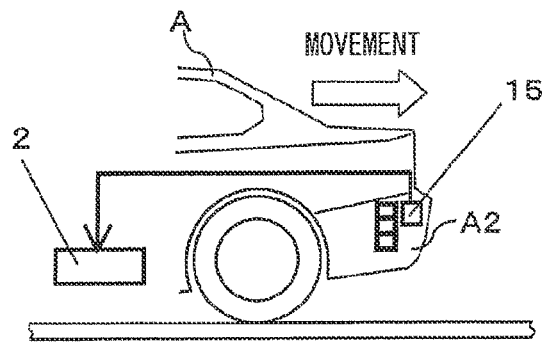
FIG. 4 is a block diagram of a system according to a modified embodiment.

The present disclosure is not restricted to preceding embodiments. For example, it is possible to use a contact sensor (touch sensor) or a pressure sensor disposed on a front of the vehicle, e.g., on a front bumper, of on a rear of the vehicle, e.g., on a rear bumper as a collision detector. As shown in FIG. 4, in a case that a contact sensor 15 is used as a collision detector, the contact sensor 15 may be disposed on a surface of a bumper cover member, and may detect a contact of the vehicle to something. A plurality of contact sensors 15 may be disposed, e.g., on a right side and a left side of the front part, or a right side and a left side of the rear part. Since the contact sensor 15 can detects directly whether the vehicle come in contact with something or not, it is possible to detect a light collision and can detect a collision with more accuracy. In a case that the contact sensor 15 sends a signal of ON (contact) or OFF (non-contact), the collision determining module 201 determines a collision in response to a signal of ON. Moreover, it is possible to use an inclination sensor, e.g., a tilt sensor) or a tire pressure sensor may be used as a run-up detector.

Figure 5:
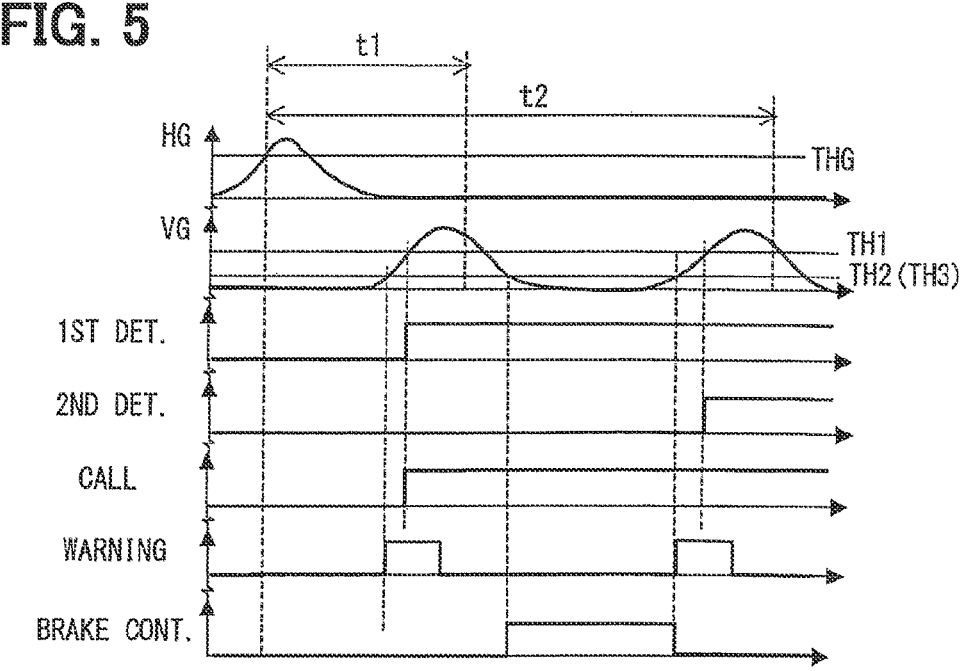
FIG. 5 is a timing diagram showing an example of operation of a system according to a modified embodiment.
Figure 6:
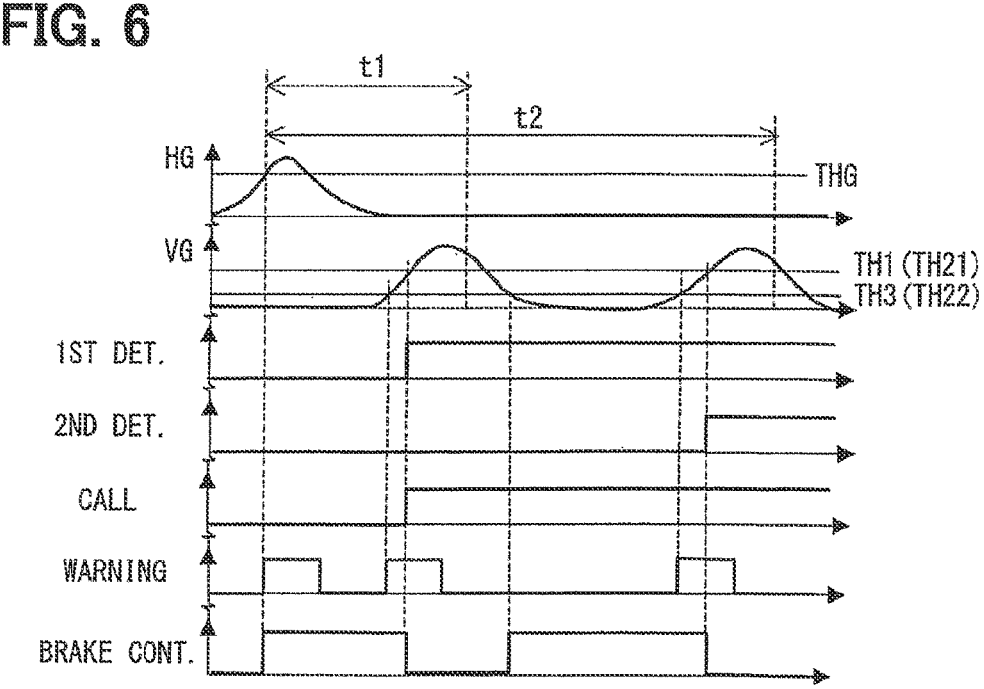
FIG. 6 is a timing diagram showing an example of operation of a system according to a modified embodiment.

Alternative to the above-mentioned embodiments, an intervening brake control started after a collision existence determination may be removed as shown in FIG. 5. This modification provides different pattern of the intervening brake control in an accident. Similarly, a warning just after a collision existence determination may be removed as shown in FIG. 6. This modification provides different pattern of the warning in an accident. Those modifications can eliminate an intervening brake control and a warning before completing a determination whether an accident relates to a run-over or not. Moreover, it is possible to set the first threshold TH1 and the second threshold TH2 in the same value. In this case, an Intervening brake control is continued until an existence of a run-up is determined after an existence of a collision is determined or an ending of a previous run-up is determined. In order to reduce a run-over accident by generating a warning at an early stage, it is desirable that the second threshold TH2 is less than the first threshold TH1.

Moreover, the second threshold may have two different threshold values to provide a warning and an intervening brake control at appropriate timings. One value of the second threshold is related to a generating of a warning. The other one of the second threshold is related to an intervening brake control. FIG. 6 shows a modification in which the second threshold has two different values TH21 and TH22. The threshold TH21 is set as the second threshold for brake control. The threshold TH21 is set equal to the first threshold TH1. Thereby, it is possible to continue the intervening brake control until a heavy run-up begins, i.e., until an existence of a run-up is determined. The threshold TH22 is set as the second threshold for warning control. The threshold TH22 is set less than the first threshold TH1. Thereby, it is possible to generate a warning at early stage. By activating a brake device until a heavy run-up begins, it is possible to reduce damages at a first run-over or a second run-over.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, are preferred, other combinations and configurations, including more, less or only a single element, are also within the spirit and scope of the present disclosure.

What is claimed is:

1. A system for detecting a run-over accident, the system comprising:
   a collision detector which detects a collision and is arranged on at least one of a front or a rear of a vehicle;
   a collision determining module which determines whether a collision exists or not based on a detection result of the collision detector;
   a run-up detector which detects that a tire of the vehicle runs up onto something;
   a run-up determining module which determines whether a run-up exists or not based on a detection result of the run-up detector;
   a run-over determining module which determines that a run-over accident exists when the run-up determining module determines an existence of a run-up within a predetermined first time period after the collision determining module determines an existence of a collision.

2. The system in claim 1, further comprising:
   a reporting module which reports information about the run-over accident to a predetermined entity when the run-over determining module determines an existence of a run-over accident.

3. The system in claim 1, further comprising:
   a warning module which generates warning to a driver, wherein
   the run-up determining module stores a first threshold for determining an existence of a run-up or not and a second threshold, which is equal to or lower than the first threshold, for determining a beginning of a run-up, and determines a beginning of a run-up when the detection result of the run-up detector exceeds the second threshold, and wherein
   the warning module generates a warning for a predetermined second time period when the run-up determining module determines a beginning of a run-up within the predetermined first time period after the collision determining module determines an existence of a collision.

4. The system in claim 3, wherein
   the warning module generates a warning for the predetermined second time period when the collision determining module determines an existence of a collision.

5. The system in claim 3, wherein
   the warning module generates a warning for the predetermined second time period, after the run-over determining module determines an existence of a previous run-over accident, when the run-up determining module determines a beginning of a run-up within the predetermined second time period after the collision determining module determines an existence of a collision which is a basis for the determination of the previous run-over accident.

6. The system in claim 1, further comprising:
   an intervening brake control module which instructs an intervening brake control, which is a brake control direction to activate a brake, to a brake control module, wherein
   the run-up determining module stores a first threshold for determining an existence of a run-up or not, a second threshold, which is equal to or lower than the first threshold, for determining a beginning of the run-up, and a third threshold, which is less than the first threshold, for determining an ending of the run-up, and determines a beginning of the run-up when the detection result of the run-up detector exceeds the second threshold, and determines an ending of the run-up when the detection result of the run-up detector first falls below the third threshold after the detection result of the run-up detector exceeds the first threshold, and wherein
   the intervening brake control module begins the intervening brake control after the run-up determining module determines the ending of the run-up, and stops the intervening brake control when the run-up determining module determines the beginning of the run-up during the time the intervening brake control is executed.

7. The system in claim 6, wherein
   the intervening brake control module begins the intervening brake control when a speed, which is a speed of the vehicle when the collision determining module determines the existence of the collision, is equal to or less than a predetermined speed.

8. The system in claim 1, further comprising:
   an intervening brake control module which instructs an intervening brake control, which is a brake control direction to activate a brake, to a brake control module, wherein
   the run-up determining module stores a first threshold for determining an existence of a run-up or not, and a second threshold, which is equal to or lower than the first threshold, for determining a beginning of the run-up, and determines the beginning of the run-up when the detection result of the run-up detector exceeds the second threshold, and wherein
   the intervening brake control module begins the intervening brake control after the collision determining module determines an existence of a collision, and stops the intervening brake control when the run-up determining module determines the beginning of the run-up within the predetermined first time period.

9. The system in claim 1, wherein
   the run-over determining module varies the predetermined first time period according to a speed of the vehicle.

10. The system in claim 1, further comprising:
    an accident recorder which records, after the run-over determining module determines an existence of a run-over, a number of determinations showing existences of run-ups made by the run-up determining module within a predetermined second time period from a determination of a collision made by the collision determining module which is a basis for the determination of the existence of the run-over.

* * * * *